(12) United States Patent
Vangala et al.

(10) Patent No.: US 9,451,497 B2
(45) Date of Patent: Sep. 20, 2016

(54) REDUCING PACKET LOSS AT A WIRELESS COMMUNICATION DEVICE DUE TO A CONNECTION INTERRUPTION

(71) Applicant: Apple Inc., Cupertino, CA (US)

(72) Inventors: Sarma V. Vangala, San Jose, CA (US); Sreevalsan Vallath, Dublin, CA (US); Swaminathan Balakrishnan, Sunnyvale, CA (US); Vikram Bhaskara Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 13/966,203

(22) Filed: Aug. 13, 2013

(65) Prior Publication Data
US 2014/0044046 A1    Feb. 13, 2014

Related U.S. Application Data

(60) Provisional application No. 61/682,720, filed on Aug. 13, 2012.

(51) Int. Cl.
*H04W 4/00* (2009.01)
*H04W 28/02* (2009.01)
*H04L 12/801* (2013.01)
*H04L 12/807* (2013.01)

(52) U.S. Cl.
CPC ........ *H04W 28/0273* (2013.01); *H04L 47/193* (2013.01); *H04L 47/27* (2013.01)

(58) Field of Classification Search
None
See application file for complete search history.

(56) References Cited

U.S. PATENT DOCUMENTS

| 7,177,300 | B2 | 2/2007 | Murakami et al. |
| 7,187,666 | B1 * | 3/2007 | Farley et al. ................. 370/331 |
| 7,889,654 | B2 | 2/2011 | Ramakrishnan et al. |
| 7,948,950 | B2 | 5/2011 | Kezys et al. |
| 8,238,241 | B2 | 8/2012 | Samuels et al. |
| 2002/0106991 | A1 * | 8/2002 | Foore et al. .................... 455/70 |
| 2004/0090936 | A1 * | 5/2004 | Cuny et al. ................... 370/331 |
| 2005/0073981 | A1 * | 4/2005 | Banerjee et al. ............. 370/338 |
| 2005/0088972 | A1 * | 4/2005 | Zhang .................... H04L 47/10 370/235 |
| 2008/0107079 | A1 | 5/2008 | Bae et al. |

(Continued)

FOREIGN PATENT DOCUMENTS

| EP | 2 408 152 | 1/2012 |
| KR | 10-0742784 | 7/2007 |

(Continued)

OTHER PUBLICATIONS

PCT Application No. PCT/US2013/054824—International Search Report and Written Opinion dated Dec. 2, 2013.

(Continued)

Primary Examiner — Kibrom T Hailu
(74) Attorney, Agent, or Firm — Downey Brand LLP

(57) ABSTRACT

A method for reducing packet loss during data transfer from a network to a wireless communication device over a connection is disclosed. The method can include the wireless communication device signaling a first receive window size for a data transfer; determining occurrence of an event resulting in an interruption of the connection; and, in response to determining occurrence of the event, signaling a second receive window size for the data transfer prior to the event to trigger an adjustment of a data rate of the data transfer in preparation for the event.

20 Claims, 10 Drawing Sheets

(56) References Cited

U.S. PATENT DOCUMENTS

| | | | |
|---|---|---|---|
| 2008/0195745 A1 | 8/2008 | Bowra et al. | |
| 2008/0225795 A1* | 9/2008 | Sun et al. | 370/331 |
| 2009/0116451 A1* | 5/2009 | Ng | H04L 12/5692 370/331 |
| 2009/0219886 A1 | 9/2009 | Rune | |
| 2009/0219892 A1 | 9/2009 | Kim et al. | |
| 2010/0014419 A1* | 1/2010 | Lee et al. | 370/225 |
| 2011/0007713 A1* | 1/2011 | Kobayashi | H04W 28/06 370/332 |
| 2011/0013553 A1* | 1/2011 | Patel | H04W 80/06 370/315 |
| 2011/0064052 A1* | 3/2011 | Lee | H04W 36/0022 370/331 |
| 2011/0164589 A1* | 7/2011 | Lee et al. | 370/331 |
| 2011/0228685 A1* | 9/2011 | Higashi et al. | 370/252 |
| 2011/0249559 A1* | 10/2011 | Sun | H04L 1/187 370/237 |
| 2011/0268023 A1* | 11/2011 | Srinivasan | H04W 72/085 370/328 |
| 2012/0040675 A1* | 2/2012 | Otte | H04W 36/0088 455/436 |
| 2012/0069731 A1* | 3/2012 | Tooher | H04W 76/026 370/221 |
| 2012/0190362 A1* | 7/2012 | Subbarayudu | H04W 76/048 455/435.1 |
| 2012/0322497 A1* | 12/2012 | Navda et al. | 455/525 |
| 2013/0017805 A1* | 1/2013 | Andre-Jonsson et al. | 455/411 |
| 2013/0084842 A1* | 4/2013 | Laitinen et al. | 455/418 |
| 2013/0143570 A1* | 6/2013 | Kapoor et al. | 455/436 |
| 2013/0267267 A1* | 10/2013 | Mujtaba et al. | 455/509 |
| 2014/0050095 A1* | 2/2014 | Szilagyi et al. | 370/236 |

FOREIGN PATENT DOCUMENTS

| | | |
|---|---|---|
| KR | 10-0747902 | 8/2007 |
| WO | WO2012006595 | 1/2012 |

OTHER PUBLICATIONS

Taiwanese Patent Application No. 102129037—Office Action dated Mar. 11, 2015.

Goff et al.: "Freeze-TCP: A true end-to-end TCP enhancement mechanism for mobile environments". Electrical Engineering Deparment, State University of New York, Binghamton, NY, Sun Microsystems Inc., Mountain View, CA, INFOCOM'2000, Mar. 2000.

\* cited by examiner

REDUCING PACKET LOSS AT A WIRELESS COMMUNICATION DEVICE DUE TO A CONNECTION INTERRUPTION

CROSS-REFERENCE TO RELATED APPLICATIONS

This application claims priority to U.S. Provisional Patent Application No. 61/682,720, filed on Aug. 13, 2012, which is incorporated herein in its entirety by reference.

FIELD OF THE DESCRIBED EMBODIMENTS

The described embodiments generally relate to wireless communications technology, and more particularly to systems, methods, apparatuses, and computer-readable mediums for reducing packet loss at a wireless communication device in the event of a connection interruption.

BACKGROUND

Many wireless communication devices utilize a single radio to communicate via multiple radio access technologies (RATs). In such single radio devices, the device can only tune to a single network/single RAT at a given time. Thus, if such a device is receiving data over a downlink (DL) connection via a network using a first RAT and tunes its radio from the first network to a network using a second RAT, such as in the case of a tune-away period from a Long Term Evolution (LTE) system to a 1× system to listen for paging messages on the 1× system, packets transmitted to the device during the tune-away period may be lost.

Packet loss suffered by a wireless communication device during an event causing a connection interruption, such as in the case of the device tuning its radio from a first network to a second network, can result in a break in the receipt of packets for a data transfer at the data layer. Further, such packet loss can cause a severe degradation of the throughput performance of the data transfer. In this regard, since the receiver conditions may be unknown to the sender, the packet loss can result in implementation of transmission control protocol (TCP) flow control mechanisms by the sender. These flow control mechanisms can include mechanisms, such as timeouts and data rate reductions, which may be undesirable and can result in a reduced throughput for the data transfer for a significant amount of time after the completion of the event that resulted in the connection interruption.

SUMMARY OF THE DESCRIBED EMBODIMENTS

Some embodiments disclosed herein provide for reducing packet loss at a wireless communication device in the event of a connection interruption. In this regard, a wireless communication device in accordance with some example embodiments that is receiving data over a network can leverage local knowledge of an occurrence of an event resulting in an interruption of the connection via which the device is receiving data and can preemptively signal an updated receive window size for the data transfer in advance of the event. The wireless communication device of such example embodiments can accordingly use the updated receive window size to control a flow of packets sent by a sender that does not have knowledge of the connection interruption event so that the sender adjusts the rate of sending packets to avoid packet loss during the event. As a result of the adjustment in packet flow from the sender, packet loss during the event may be reduced, or even eliminated in some cases, and TCP timeouts that would ultimately reduce the longer term throughput of the data transfer may be reduced. Users and wireless communication devices can accordingly benefit from enhanced throughput that can be provided by such example embodiments. Moreover, such example embodiments can benefit network operators, as the reduction in packet loss provided by such example embodiments can provide for a corresponding reduction in the retransmission of lost packets by network operators.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Figure 1:
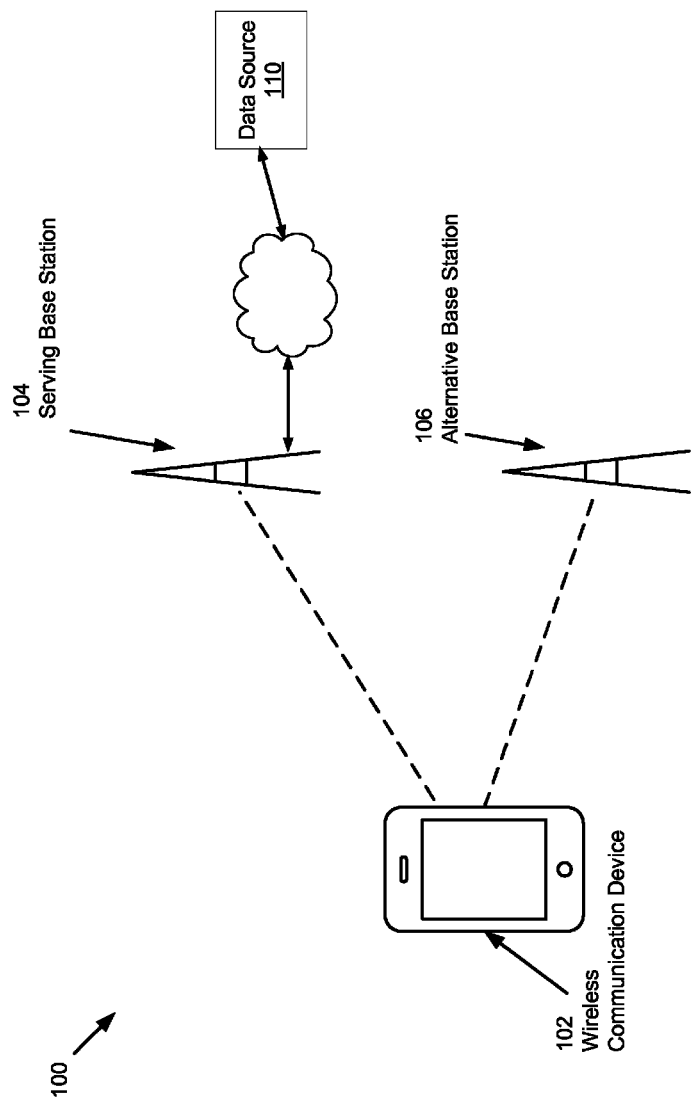
FIG. 1 illustrates a wireless communication system in accordance with some example embodiments.

Wireless communication devices participating in a data transfer to the wireless communication device can suffer a physical layer connection interruption for any of a variety of reasons. A sender sending data to the wireless communication device can be unaware of the physical layer connection interruption, and can continue to send data packets to the wireless communication device during the event causing the connection interruption. These packets can be lost, as the wireless communication device can be unable to receive packets during the connection interruption.

For example, a device using a single radio to communicate via multiple RATs, such as a single radio Long Term Evolution (SRLTE) device, can temporarily tune-away from a cell using a serving RAT to a cell using an alternative RAT to perform measurements of the alternative RAT, listen for paging messages on the alternative RAT, and/or the like. During this tune-away period, packets transmitted to the wireless communication device can be lost.

As another example, a device supporting multiple RATs can transition from a network using a first RAT to a network using a second RAT in a process known as an inter-RAT (iRAT) transition. During the iRAT transition, the device can suffer from a physical layer connection interruption. As such, if a sender in a data transfer is unaware of the iRAT transition and continues to send packets to the wireless communication device during the interruption, the packets can be lost.

As still a further example, some wireless communication devices can operate primarily on networks that do not support voice calls, such as some LTE networks. When operating on a network that does not support voice calls, such wireless communication devices "fall back" to a legacy network having a circuit switched domain configured to support voice calls in the event that a voice call is received or placed by the device through a procedure known as circuit switched fallback (CSFB). The wireless communication device can suffer from a physical layer connection interruption as a result of the CSFB procedure. As such, if a sender in a data transfer is unaware of the CSFB procedure and continues to send packets to the wireless communication device during the interruption, the packets can be lost.

As yet another example, wireless communication devices can transition between base stations (e.g., between cells) in operation due to mobility. When transitioning to a new base station, such as through handover, redirection, reselection, or the like, wireless communication devices often perform a registration procedure to the new base station and/or to a network associated with the base station. Performance of the registration procedure can result in a temporary physical layer connection interruption. As such, if a sender in a data transfer is unaware that the device is performing a registration and continues to send packets to the wireless communication device during the interruption, the packets can be lost.

Packet loss suffered by a wireless communication device during an event causing a connection interruption can result in a break in the receipt of packets for a data transfer at the data layer. Further, such packet loss can cause a severe degradation of the throughput performance of the data transfer. In this regard, since the receiver conditions may be unknown to the sender, the packet loss can result in implementation of flow control mechanisms, such as TCP flow control mechanisms, by the sender. These flow control mechanisms can include mechanisms, such as timeouts and data rate reductions, which may be undesirable and can result in a reduced throughput for the data transfer for a significant amount of time after the completion of the event that resulted in the connection interruption. In this regard, as the sender can assume from the packet loss that the connection is congested and/or that the wireless communication device is otherwise able to receive less data than the device actually can receive after recovery of the physical layer connection, the sender can send data to the wireless communication device at a lower data rate than the sender would have otherwise used had the packet loss not occurred.

Some example embodiments reduce packet loss at a wireless communication device in the event of a connection interruption. In this regard, a wireless communication device of some example embodiments that is receiving data over a network can leverage local knowledge of an occurrence of an event resulting in an interruption of the connection via which the device is receiving data and preemptively signal an updated receive window size for the data transfer. In this regard, the updated receive window size may be used by the receiving wireless communication device to control a flow of packets sent by a sender that does not have knowledge of the connection interruption event so that the sender adjusts the rate of sending packets during the event. As a result of the adjustment in packet flow from the sender, packet loss during the event may be reduced, or even eliminated in some cases, and timeouts (e.g., TCP timeouts) that would ultimately reduce the longer term flow rate may be reduced.

For example, in some embodiments, a zero window can be signaled by a wireless communication device receiving data in a data transfer so that the sender does not send data during a period during which the wireless communication device is unable to receive packets. Accordingly, flow control of data sent by a sender that does not have knowledge of a connection interruption event at the receiver can be influenced by the receiving device through use of advertised receive window sizes in accordance with some example embodiments.

Further, a wireless communication device of some example embodiments can leverage advanced knowledge of a scheduled event and signal in advance of the event so that the sender can enact flow control measures on the basis of the advertised window in sufficient time to avoid packet loss due to the event. In this regard, the wireless communication device of some such embodiments can use a known round trip time (RTT) to advertise an updated receive window size sufficiently in advance of a scheduled event so that the signaled receive window size is received by the sender and flow control measures are enacted by the sender based on the updated receive window size in time to avoid packet loss and timeouts (e.g., TCP timeouts).

FIG. 1 illustrates a wireless communication system 100 in accordance with some example embodiments. The wireless communication system 100 can include a wireless communication device 102. By way of non-limiting example, the wireless communication device can comprise a cellular phone, such as a smart phone device, a tablet computing device, and/or the like.

The system 100 can further include a serving base station 104. The serving base station 104 can be any type of cellular network access point depending on a type of RAT implemented by the serving base station 104, including, by way of non-limiting example, an evolved node B (eNB), node B, base transceiver station (BTS), and/or other base station.

The serving base station 104 can be configured to provide network access to the wireless communication device 102 via any present or future developed cellular RAT, such as, by way of non-limiting example, an LTE RAT, such as LTE or LTE-Advanced (LTE-A); Universal Mobile Telecommunications System (UMTS); code division multiple access (CDMA); CDMA2000; Time Division Synchronous Code Division Multiple Access (TD-SCDMA); Wideband Code Division Multiple Access (WCDMA); Global System for Mobile Communications (GSM); High Rate Packet Data (HRPD); and/or other present or future developed cellular RAT.

The wireless communication device 102 can access a network via the serving base station 104. In this regard, the serving base station 104 can serve as a network access point for the wireless communication device 102 by providing network access to the wireless communication device 102. The wireless communication device 102 can be receiving a data transfer from a data source 110 over a network via the serving base station 104. The data source 110 can, for example, be a remote server or other computing device configured to function as a sender of data in a data transfer.

The system 100 can additionally include an alternative base station 106. Like the serving base station 104, the alternative base station 106 can be any type of cellular network access point depending on a type of RAT implemented by the alternative base station 106, including, by way of non-limiting example, an eNB, node B, BTS, and/or other base station. The alternative base station 106 can be configured to provide network access via any present or future developed cellular RAT, such as, by way of non-limiting example, an LTE RAT, (e.g., LTE or LTE-A), UMTS, CDMA, CDMA2000, TD-SCDMA, WCDMA, GSM, HRPD, and/or other present or future developed cellular RAT. In some implementations, the alternative base station 106 can implement the same RAT as the serving base station 104. However, in alternative implementations, the alternative base station 106 or can use a different RAT than the serving base station 104.

The wireless communication device 102 can be within radio signaling range of the alternative base station 106. In this regard, the wireless communication device 102 can be within sufficient range of the alternative base station 106 such that the wireless communication device 102 can communicate with the alternative base station 106. Thus, for example, the wireless communication device 102 can transition from the serving base station 104 (e.g., from a cell associated with the serving base station 104) to the alternative base station 106 (e.g., to a cell associated with the alternative base station 106), such as through handover, redirection, reselection, and/or the like. As a further example, the wireless communication device 102 can tune a radio that can be implemented on the wireless communication device 102 from the serving base station 104 to the alternative base station 106 to communicate with the alternative base station 106. In some instances, when tuning its radio from the serving base station 104 to the alternative base station 106, transitioning to the alternative base station 106, and/or otherwise listening to or communicating with the alternative base station 106, the wireless communication device 102 can experience a connection interruption that can interrupt an ongoing data transfer from the data source 110 over a connection using the serving base station 104.

It will be appreciated, however, that the wireless communication system 100 is provided by way of example, and not by way of limitation. In this regard, embodiments may be implemented mutatis mutandis in other types of wireless communication systems. Further, network access points other than base stations can be configured to provide network access to and communicate with wireless communication device 102 in accordance with various example embodiments.

Figure 2:
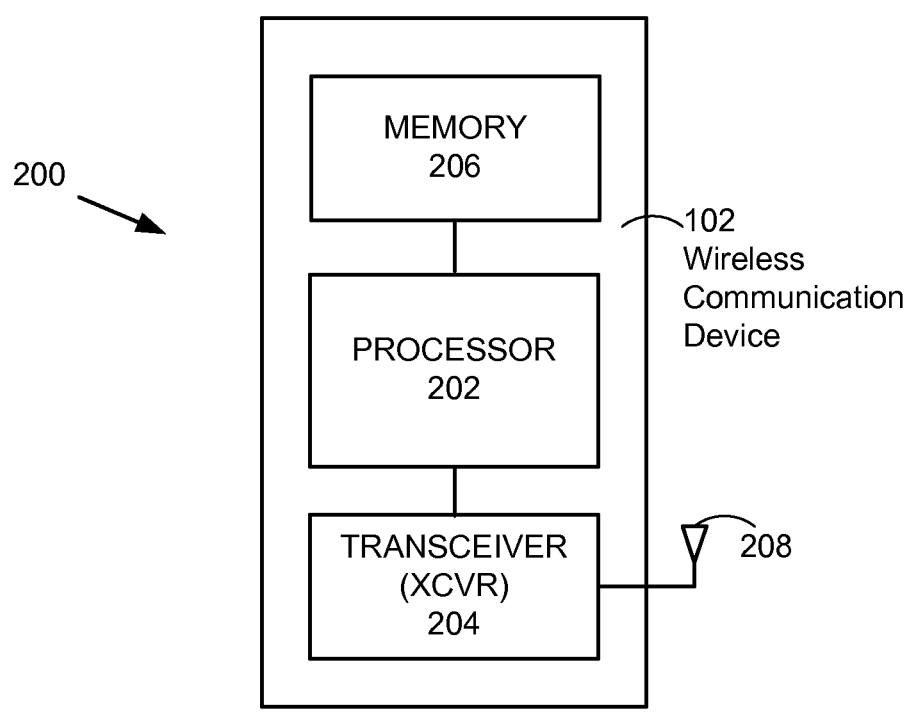
FIG. 2 illustrates a block diagram of an example apparatus that can be implemented on a wireless communication device in accordance with some example embodiments.

FIG. 2 illustrates a block diagram of an example apparatus 200 that can be implemented on a wireless communication device 102 in accordance with some example embodiments. Apparatus 200 can include a processor 202 coupled with memory 206 and also coupled with a wireless transceiver 204. Wireless transceiver 204 can be coupled with an antenna 208. Processor 202 can be configured to read, write and execute processor instructions stored in memory 206. Processor 202 can also be configured to control wireless transceiver 204. In some embodiments, wireless transceiver 204 can connect to wireless networks, via an access point, such as the serving base station 104 and/or alternative base station 106 (e.g., via antenna 208). Accordingly, in some such example embodiments, the wireless transceiver 304 can be configured to enable signaling a receive window size in accordance with various example embodiments described further herein below. Further, in some such example embodiments, the processor 202 can be configured to control one or more operations that can be performed by a wireless communication device 102 in accordance with various example embodiments. For example, the processor 202 can be configured to determine occurrence of an event resulting in an interruption of a connection and determine to signal a receive window size in response to occurrence of the event in accordance with various example embodiments as described further herein below.

Figure 3:
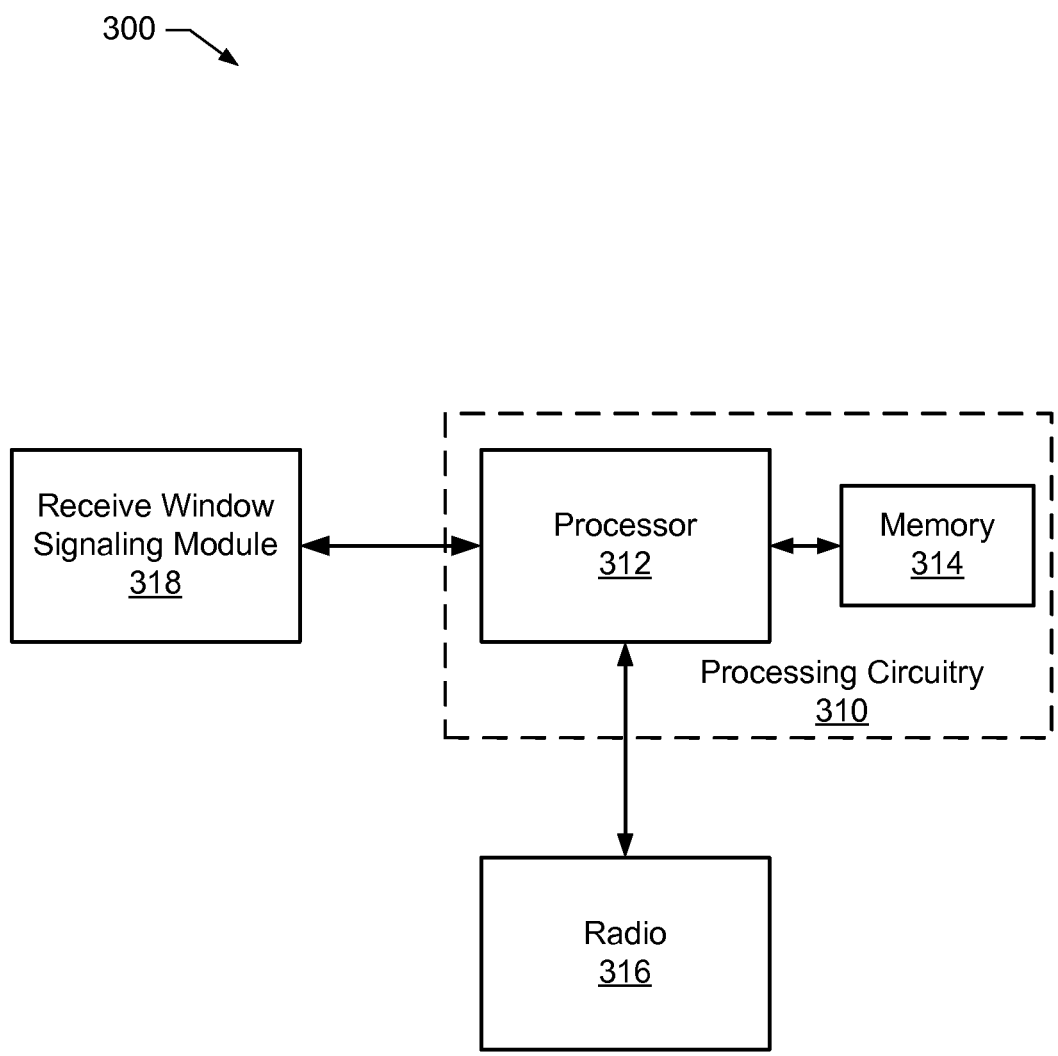
FIG. 3 illustrates a block diagram of another example apparatus that can be implemented on a wireless communication device in accordance with some example embodiments.

FIG. 3 illustrates a block diagram of another example apparatus that can be implemented on a wireless communication device 102 in accordance with some example embodiments. In this regard, FIG. 3 illustrates an apparatus 300 that can, when implemented on a computing device, such as wireless communication device 102, enable the computing device to operate within the system 100 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300, including one or more functionalities of wireless communication device 102, in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate in the system 100 when implemented on or otherwise operably coupled to the computing device. Thus, for example, one or more components of the apparatus 300 can provide a chipset configured to enable a computing device to connect to and operate over a wireless network via a connection to a wireless network access point, such as the serving base station 104 and/or alternative base station 106. In accordance with some example embodiments, one or more components of the apparatus 300 can provide a cellular baseband chipset.

In some example embodiments, the processing circuitry 310 can include a processor 312 and, in some embodiments, such as that illustrated in FIG. 3, can further include memory 314. The processor 312 can, for example, be an embodiment of the processor 202. The memory 314 can, for example, be an embodiment of the memory 206. As such, in some example embodiments, the processing circuitry 310 can be at least partially embodied by the processor 202 and/or memory 206. The processing circuitry 310 can be communicatively coupled with or otherwise control a radio 316 and/or receive window signaling module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 214 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, radio 316, or receive window signaling module 318 via a bus (or buses) for passing information among components of the apparatus 300.

The apparatus 300 can further include a radio 316. The radio 316 can, for example, be an embodiment of the transceiver 204. The radio 316 can be configured to enable the apparatus 300 to send wireless signals to and receive signals from a wireless network via a connection to a wireless network access point, such as the serving base station 104 and/or alternative base station 106. As such, the radio 316 can be configured to support any type of RAT that can be implemented by the serving base station 104 and/or alternative base station 106 and/or that can otherwise be supported by the wireless communication device 102.

The apparatus 300 can further include receive window signaling module 318. The receive window signaling module 318 can be embodied as various means, such as circuitry, hardware, a computer program product comprising a computer readable medium (for example, the memory 314) storing computer readable program instructions that are executable by a processing device (for example, the processor 312), or some combination thereof. The receive window signaling module 318 can be configured to determine occurrence of an event resulting in an interruption of a connection and determine to signal a receive window size in response to occurrence of the event to influence the sender (e.g., the data source 110) to adjust the data rate of the data transfer to reduce packet loss during the event in accordance with one or more example embodiments disclosed herein.

The wireless communication device 102 can be configured to signal (e.g., advertise) a receive window size for a data transfer being received over a connection via the serving base station 104. The signaled receive window size can, for example, be a TCP receive window size for connections using TCP. It will be appreciated, however, that other transport layer protocols can be used in lieu of TCP within the scope of the disclosure. As such, receive window sizes that can be signaled by the wireless communication device 102 in accordance with various embodiments are inclusive of receive window sizes and/or other indications of available receiver buffer space, an amount of data that can be sent without receiving an acknowledgement, or other flow control indication that can be sent by a receiver to a sender to control or otherwise influence an amount of data sent by the sender in accordance with various present or future transport layer protocols. In some example embodiments, the size of a signaled receive window size can be determined by the receive window signaling module 318 based on observed conditions, such as available receiver buffer space, channel conditions, and/or other conditions that can affect the data transfer.

In some example embodiments, a receive window size can be signaled in conjunction with an acknowledgement (ACK), which can be sent by the wireless communication device 102 in response to receipt of a packet(s) and/or other portion of data that can be received by the wireless communication device 102 attendant to a data transfer to the wireless communication device 102 from a sender, such as the data source 110. In some such example embodiments, the receive window size can be signaled with every ACK, every n ACKS, and/or the like.

The receive window signaling module 318 of some example embodiments can be configured to determine occurrence of an event resulting in an interruption of the connection over the serving base station 104. Such an event can include any event that can result in an interruption or break in the physical layer connection. For example, such an event can include any event in which the wireless communication device 102 tunes its radio from the serving base station 104 to the alternative base station 106. In this regard, a connection interruption event can be any event that can result in at least a temporary loss of radio resource for the connection and/or outage of the underlying physical layer. Accordingly, packets sent for a data transfer to the wireless communication device 102 that would otherwise arrive during the event can be lost absent implementation of various embodiments disclosed herein.

As one example of a connection interruption event, the wireless communication device 102 can be camped on a first RAT, which can be implemented by the serving base station 104 and tune the radio 316 away from the first RAT for a tune-away period to scan and/or otherwise listen to a second RAT that can be implemented by the alternative base station 106. For example, in some embodiments, the serving base station 104 can implement an LTE RAT, which may be unable to support voice calls, and the alternative base station 106 can implement a legacy RAT, such as a second generation (2G) RAT (e.g., GSM or other 2G RAT) or a third generation (3G) RAT (e.g., UMTS, CDMA2000, or other 3G RAT), that can include a circuit switched domain for supporting voice calls. In such embodiments, the wireless communication device 102 can, for example, tune the radio 316 away from the serving base station 104 to the alternative base station 106 for a tune-away period to listen for paging messages, such as voice call paging messages, on the legacy RAT.

As a further example of a connection interruption event, the wireless communication device 102 can perform an iRAT transition from a first RAT that can be implemented by the serving base station 104 to a second RAT that can be implemented by the alternative base station 106. Such iRAT transition can, for example, be performed due to mobility of the wireless communication device 102 and/or as part of a CSFB procedure. As still a further example of a connection interruption event, the wireless communication device 102 can move from an area covered by the serving base station 104 to an area covered by the alternative base station 106 and perform a registration event to transition to the alternative base station 106.

In response to determining occurrence of an event resulting in an interruption of the connection, the receive window signaling module 318 of some example embodiments can be configured to select an updated receive window size for the data transfer. The updated receive window size can be signaled by the wireless communication device 102 prior to the event to trigger an adjustment of the data rate of the transfer by the data source 110 in preparation for the event. In this regard, packet loss during the event can be reduced by preemptively influencing the data source 110 to adjust the data rate of the data transfer by modifying the advertised receive window size in advance of the event.

For example, the wireless communication device 102 of some example embodiments can signal a zero window so that the sender does not send data that would otherwise arrive at the wireless communication device 102 during the event. The wireless communication device 102 can subsequently signal a receive window size enabling the sender to resume sending data at a time at which the wireless communication device 102 can again receive data packets over the connection.

As a more particular example of the use of a zero window, in the event that the wireless communication device 102 is performing a tune-away, the wireless communication device 102 of some example embodiments can signal a zero window in advance of the tune-away period so that data packets are not lost during the tune-away period, and can then signal a receive window size configured to trigger resumption of the data transfer following return of the wireless communication device 102 to the serving base station 104 from the tune-away period so that data packets are again sent by the data source 110 and arrive at the wireless communication device at a time when the wireless communication device 102 can receive the data packets. Accordingly, packet loss and implementation of flow control mechanisms by the data source 110 in response to packet loss that can reduce throughput even after tune tune-away period can be avoided.

In some example embodiments, the wireless communication device 102 can be configured to signal a receive window size equal to that used before the tune-away period (e.g., the last non-zero receive window size signaled prior to advertising the zero window) so that data packets are again sent by the sender and arrive at the wireless communication device 102 at the same rate as prior to the tune-away period without loss of throughput after the tune-away period.

As another example use of a zero window in accordance with some example embodiments, the wireless communication device 102 of some example embodiments can be configured to signal a zero window receive window size in advance of a registration event and/or in advance of an iRAT transition, so that data packets are not lost during the registration or iRAT transition. The wireless communication device 102 can then later signal a connection-appropriate window size that can be selected by the receive window signaling module 318 to trigger the data source 110 to resume sending data to the wireless communication device 102 at a time when the wireless communication device 102 is again able to receive data packets, such as after completion of the registration or iRAT transition.

In some circumstances, a receive window size other than zero window can be signaled in response to determining occurrence of an event resulting in an interruption of the connection. For example, in the case of an iRAT transition of the wireless communication device 102, the RAT to which the wireless communication device 102 is transitioning may support a different data rate than the initial serving RAT, such as in the case of a transition from LTE to a 2G/3G legacy RAT, or vice versa. Accordingly, in some example embodiments, a window size reflective of a change in data rate of the new RAT can be selected by the receive window signaling module 318 and preemptively signaled by the wireless communication device 102 to enable early adjustment of the flow to accommodate more optimum use of the available bandwidth of the new RAT rather than waiting for adaptive window control mechanisms, which can result in long term reduction in throughput, to be triggered. For example, if transitioning from LTE to a 2G/3G RAT, a smaller receive window size than had previously been signaled can be sent before bandwidth constraints trigger adaptive TCP flow control mechanisms that might otherwise result in at least temporarily reducing throughput performance below that supported by the RAT. As another example, if transitioning from a 2G/3G RAT to LTE, a larger receive window size than had previously been signaled can be sent so that usage of the greater bandwidth offered by LTE can be leveraged for the data transfer more quickly following completion of the iRAT transition. In this regard, knowledge by the wireless communication device 102 of its local radio connection conditions can be leveraged to influence the data rate of a data transfer from a sender, such as the data source 110.

The wireless communication device 102 of some example embodiments can be configured to support communication between a physical layer and a higher layer, such as a transport layer and/or application layer in order to support the flow control mechanisms described herein. In this regard, a physical layer may have knowledge of an event resulting in interruption of the connection. The physical layer can accordingly communicate an indication of this knowledge to a higher layer, such as to the transport layer and/or application layer that can be configured to coordinate receive window size and/or other flow control mechanisms for a data transfer to enable signaling of an appropriate receive window size to reduce data packet loss during the event. Thus, for example, in some embodiments, the receive window signaling module 318 can be configured to determine an occurrence of an event resulting in an interruption of the connection used by a data transfer based at least in part on an indication that can be provided by a physical layer to a higher layer in advance of the event.

Figure 4:
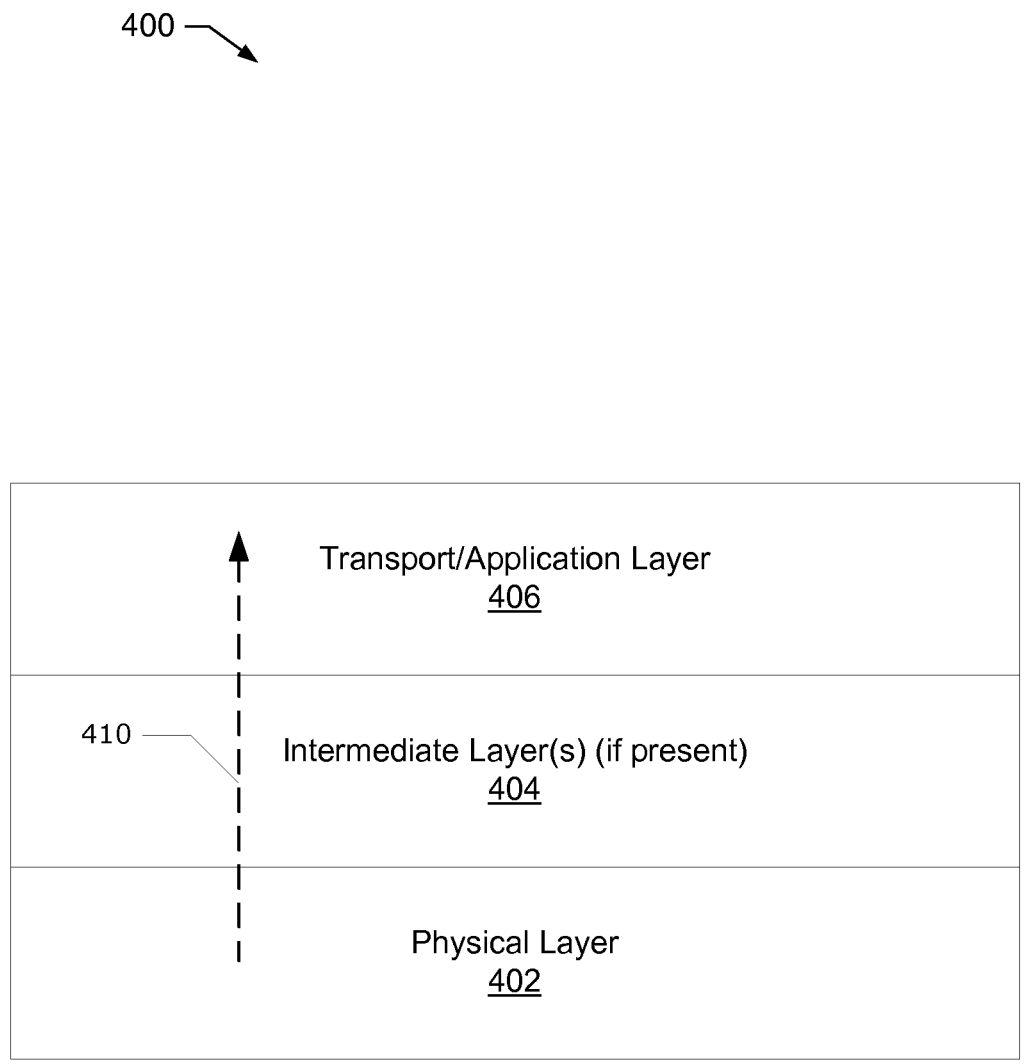
FIG. 4 illustrates communication between system layers in accordance with some example embodiments.

FIG. 4 illustrates communication between system layers 400 in accordance with some example embodiments in which communication between system layers can be used by a physical layer 402 to convey knowledge of an impending connection interruption event to a higher layer, such as a transport layer and/or an application layer (e.g., transport/application layer 406), to facilitate preemptive signaling of a modified receive window size in advance of the event. As illustrated in FIG. 4, the physical layer 402 can be configured to provide an indication 410 of an upcoming connection interruption event to the transport/application layer 406. In some embodiments, one or more intermediate layers 404 can be disposed between the physical layer 402 and transport/application layer 406. However, in some embodiments, there may not be any intermediate layers between the physical layer 402 and transport/application layer 406. In some embodiments including an intermediate layer(s) 404, the physical layer 402 and transport/application layer 406 may not be able to directly communicate with each other. As such, in some embodiments, the indication 410 can be forwarded or otherwise relayed by the intermediate layer(s) 404 from the physical layer 402 to the transport/application layer 406.

In some embodiments, the indication 410 can include additional details about the connection interruption event, such as an indication of a type of event (e.g., tune-away period, iRAT transition, CSFB procedure, registration event, and/or the like) causing the connection interruption. Additionally or alternatively, in some example embodiments, the indication 410 can include an indication of a time at which the event will occur (e.g., in terms of an absolute time, an offset from a present time, and/or other indication that can be used to define when an event is going to occur), a duration of the event, and/or other information about the event that can be used by the receive window signaling module 318 to determine an appropriate receive window size and/or timing of sending an updated receive window size in advance of the event.

Some events, such as tune-away periods, which can result in an interruption of the connection, can be performed on a scheduled basis. Accordingly the receive window signaling module 318 of some example embodiments can be configured to determine an impending occurrence of a scheduled event and can select a zero window or other event-appropriate receive window size, which can be signaled by the wireless communication device 102 prior to the scheduled occurrence of the event.

In some example embodiments, the receive window signaling module 318 can be configured to determine occurrence of an event resulting in an interruption of the connection at least in part by predicting that the event will occur based on observed conditions. For example, the receive window signaling module 318 can be configured in some example embodiments to predict that a registration event is going to occur based at least in part on a measurement of the serving base station 104 and/or of the alternative base station 106 that can be performed attendant to operation of the wireless communication device 102 of some example embodiments. In this regard, the wireless communication device 102 of some example embodiments can be configured to measure a channel quality, such reference signal received quality (RSRQ), reference signal received power (RSRP), received signal strength indicator (RSSI), received signal code power (RSCP), signal to noise ratio (SNR), and/or the like for a serving base station, such as serving base station 104, and/or for one or more neighbor base stations, such as alternative base station 106. As such, for example, if a measured channel quality for the serving base station 104 and/or alternative base station 106 satisfies a threshold for transitioning to another cell, the receive window signaling module 318 of some example embodiments can predict that a registration event will occur. As another example, if a measured signal quality for the serving base station 104 and/or alternative base station 106 is trending over time toward a threshold for transitioning to another cell, the receive window signaling module 318 of some example embodiments can predict that a registration event will occur.

In some example embodiments, the receive window signaling module 318 can be configured to determine a time in advance of a connection interruption event at which to signal an event-appropriate receive window size that is sufficient to enable the data source 110 to receive the updated receive window size and adjust the data rate of the data transfer in time to avoid packet loss during the event. For example, the receive window signaling module 318 of some example embodiments can be configured to calculate a round trip time (RTT) for the data transfer and can use the calculated RTT to determine a time in advance of the event that is sufficient to enable the data source 110 to receive an updated receive window size and to adjust the data rate of the data transfer accordingly in advance of the connection interruption event. Accordingly, RTT can be used by the wireless communication device 102 of some example embodiments to signal an event-appropriate receive window size at a time sufficiently prior to the scheduled occurrence of the event selected based on the RTT so that a last packet sent by the data source 110 on the basis of a previously advertised receive window can arrive at the wireless communication device 102 prior to the connection interruption.

Some events resulting in an interruption of a connection can have a known duration. For example, a scheduled event, such as a scheduled tune-away period, can have a scheduled end time, or otherwise have a defined duration. As another example, in an instance in which a stack for a RAT is put to sleep, such as in the case of a tune-away, the stack can know when it is to wake up again. The wireless communication device 102 of some example embodiments can signal a receive window size allowing the data source 110 to resume sending data for the data transfer prior to an end of a connection interruption event based on knowledge of the duration or ending time of the event. For example, if a zero window had been signaled in advance of the event, knowledge of the RTT can be used to signal a receive window size enabling the sender to again send data to the wireless communication device 102 such that packets arrive at the wireless communication device 102 at, or soon after, a time when the wireless communication device 102 is again able to receive packets.

Figure 5:
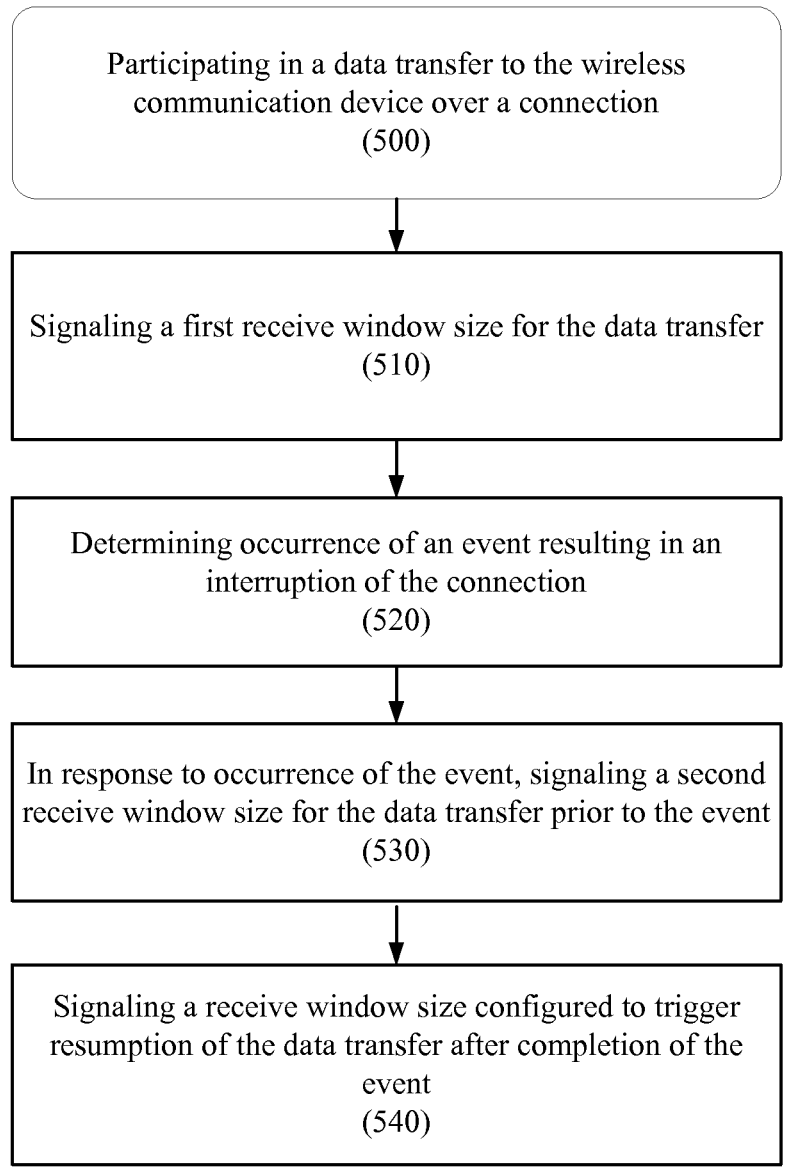
FIG. 5 illustrates a flow chart according to an example method for reducing packet loss at a wireless communication device in the event of a connection interruption in accordance with some example embodiments.

FIG. 5 illustrates a flow chart of a method for reducing packet loss at a wireless communication device in the event of a connection interruption in accordance with some example embodiments. In this regard, FIG. 5 illustrates operations that can be performed by wireless communication device 102 in accordance with some example embodiments. One or more of processor 202, transceiver 204, memory 206, processing circuitry 310, processor 312, memory 314, radio 316, or receive window signaling module 318 can, for example, provide means for performing one or more of the operations illustrated in and described with respect tot FIG. 5.

Operation 500 can include the wireless communication device 102 participating in a data transfer from a sender to the wireless communication device over a connection. The data source 110 can, for example, be the sender of the data transfer to the wireless communication device 102. The connection can, for example, be a connection through which data is received via the serving base station 104.

Operation 510 can include the wireless communication device 102 signaling a first receive window size for the data transfer. The first receive window size can be a receive window size reflective of conditions at the wireless communication device, such as an amount of available space in a receiver buffer, an observed channel condition, and/or the like.

Operation 520 can include the wireless communication device 102 determining occurrence of an event resulting in an interruption of the connection. The event can, for example, be any event that can result in an interruption or outage of a physical layer connection. For example, the event can be an event in which the wireless communication device 102 tunes a radio, such as radio 316, from the serving base station 104 to the alternative base station 106. As such, by way of non-limiting example, the event can include performance of a tune-away, such as illustrated in and described with respect to FIG. 6, performance of an iRAT transition, such as illustrated in and described with respect to FIG. 7, performance of a CSFB procedure, such as illustrated in and described with respect to FIG. 8, performance of a registration event, such as illustrated in and described with respect to FIG. 9, and/or other event in which the wireless communication device 102 can transition to or otherwise tune to the alternative base station 106.

In some example embodiments, operation 520 can be performed based at least in part on an indication that can be provided from a physical layer, such as physical layer 402, to a higher layer, such as transport/application layer 406, in accordance with some example embodiments. As another example, in some example embodiments, operation 510 can be performed based at least in part on knowledge of a scheduled event. As still a further example, in some embodiments, operation 520 can be performed based on a prediction that an event can occur. The prediction can, for example, be based on conditions that can be observed by the wireless communication device 102, such as channel quality measurements of the serving base station 104 and/or of the alternative base station 106.

Operation 530 can include the wireless communication device 102 signaling a second receive window size for the data transfer in response to occurrence of the event. The second receive window size can be signaled prior to the event occurring. For example, in some embodiments, an RTT can be calculated by the wireless communication device 102 and can be used to determine a time sufficiently in advance of the event that enables the sender to receive the second receive window size and adjust a data rate of the data transfer in accordance with the second receive window size sufficiently in advance of the connection interruption event to avoid packet loss during the event.

In some example embodiments, operation 530 can include signaling a zero window receive window size so that the sender does not send data packets that would otherwise arrive at the wireless communication device 102 during a period in which the wireless communication device 102 would be unable to receive packets due to the connection interruption event. As another example, in some instances, such as in the event of an iRAT transition in accordance with some example embodiments, operation 530 can include signaling an updated connection-appropriate receive window size that can be selected based at least in part on a data rate supported by a RAT to which the wireless communication device 102 is transitioning.

In some embodiments, the method can further include operation 540 in which the wireless communication device 102 can signal a receive window size configured to trigger resumption of the data transfer after completion of the event. For example, if a zero window receive window size was signaled in operation 530, operation 540 can include signaling a receive window size that is greater than zero to allow the data transfer to resume. In some embodiments including operation 540, operation 540 can include again signaling the first receive window size to trigger resumption of the data transfer at the same rate as prior to signaling the second receive window size. In this regard, the last non-zero receive window size can be signaled again in some example embodiments to allow for a full rate resumption of the data transfer to the prior data rate at a time when the wireless communication device is again able to receive packets on the connection.

In some embodiments, operation 540 can be omitted. For example, in some embodiments in which an updated connection-appropriate receive window size is signaled in operation 530 in advance of an iRAT transition, operation 540 can be omitted.

Figure 6:
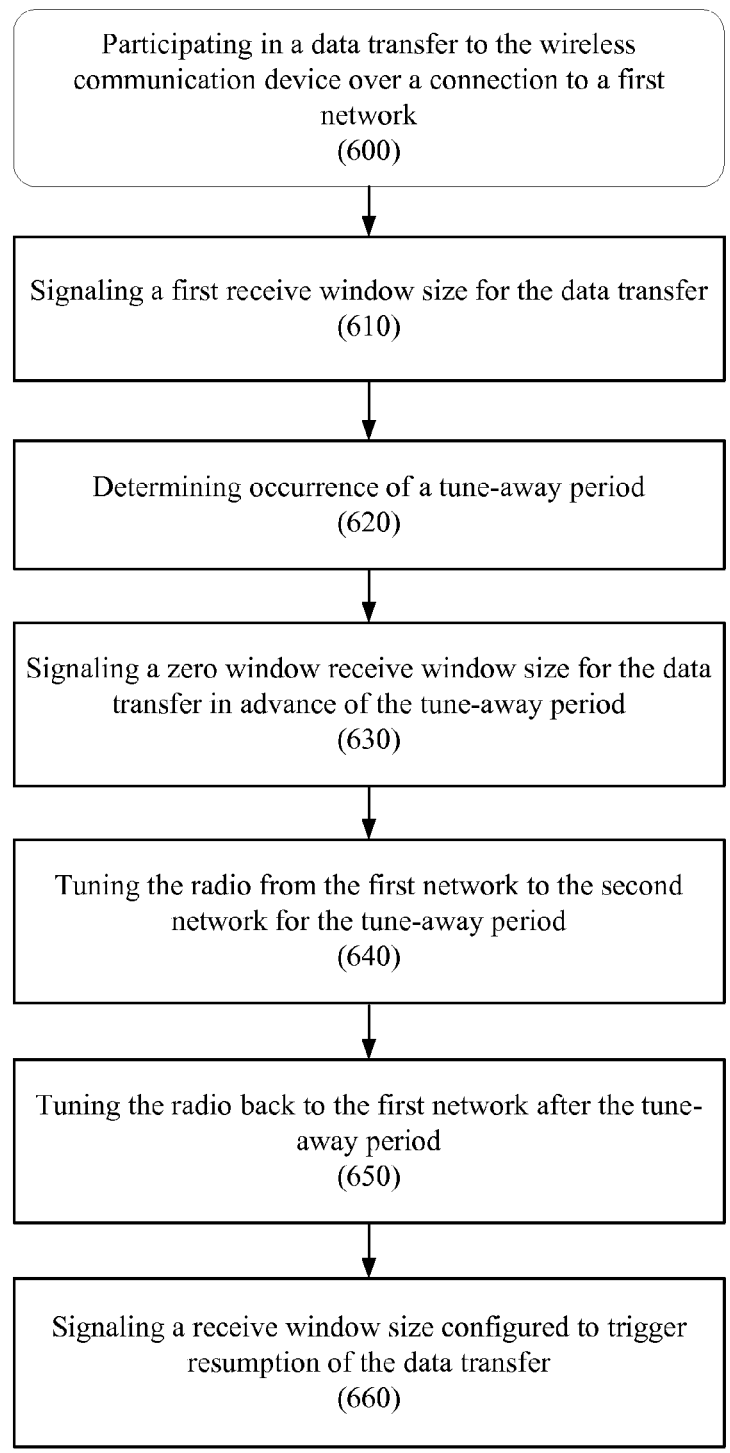
FIG. 6 illustrates a flow chart according to an example method for reducing packet loss at a wireless communication device in during a tune-away period in accordance with some example embodiments.

FIG. 6 illustrates a flow chart according to an example method for reducing packet loss at a wireless communication device in during a tune-away period in accordance with some example embodiments. In this regard, FIG. 6 illustrates operations that can be performed by wireless communication device 102 in accordance with some example embodiments in which the serving base station 104 can be associated with a first network using a first RAT and the alternative base station 106 can be associated with a second network using a second RAT. The method of FIG. 6 can, for example, be an embodiment of the method of FIG. 5 in which the connection interruption event is a tune-away. One or more of processor 202, transceiver 204, memory 206, processing circuitry 310, processor 312, memory 314, radio 316, or receive window signaling module 318 can, for example, provide means for performing one or more of the operations illustrated in and described with respect tot FIG. 6.

Operation 600 can include the wireless communication device 102 participating in a data transfer from a sender to the wireless communication device over a connection to a first network. The data source 110 can, for example, be the sender of the data transfer to the wireless communication device 102. The connection can, for example, be a connection through which data is received via the serving base station 104. In this regard, operation 600 can, for example, be an embodiment of operation 500.

Operation 610 can include the wireless communication device 102 signaling a first receive window size for the data transfer. The first receive window size can be a receive window size reflective of conditions at the wireless communication device, such as an amount of available space in a receiver buffer, an observed channel condition, and/or the like. In this regard, operation 610 can, for example, be an embodiment of operation 510.

Operation 620 can include the wireless communication device 102 determining occurrence of a tune-away period. In this regard, operation 620 can, for example, be an embodiment of operation 520.

Operation 630 can include the wireless communication device 102 signaling a zero window receive window size for the data transfer in advance of the tune-away period to stall the data transfer during the tune-away period. In this regard, operation 630 can, for example, be an embodiment of operation 530.

Operation 640 can include the wireless communication device 102 tuning the radio 316 from the first network (e.g., from the serving base station 104) to the second network (e.g., to the alternative base station 106) for the tune-away period. Operation 650 can include the wireless communication device 102 tuning the radio 316 back to the first network (e.g., back to the serving base station 104) after the tune-away period.

Operation 660 can include the wireless communication device 102 signaling a receive window size configured to trigger resumption of the data transfer after the wireless communication device 102 has returned to the first network from the tune-away period. In this regard, operation 660 can include signaling any non-zero receive window size. In some embodiments, operation 660 can include again signaling the first receive window size (e.g., the last non-zero receive window size signaled prior to operation 630). In this regard, operation 660 can, for example, be an embodiment of operation 540.

Figure 7:
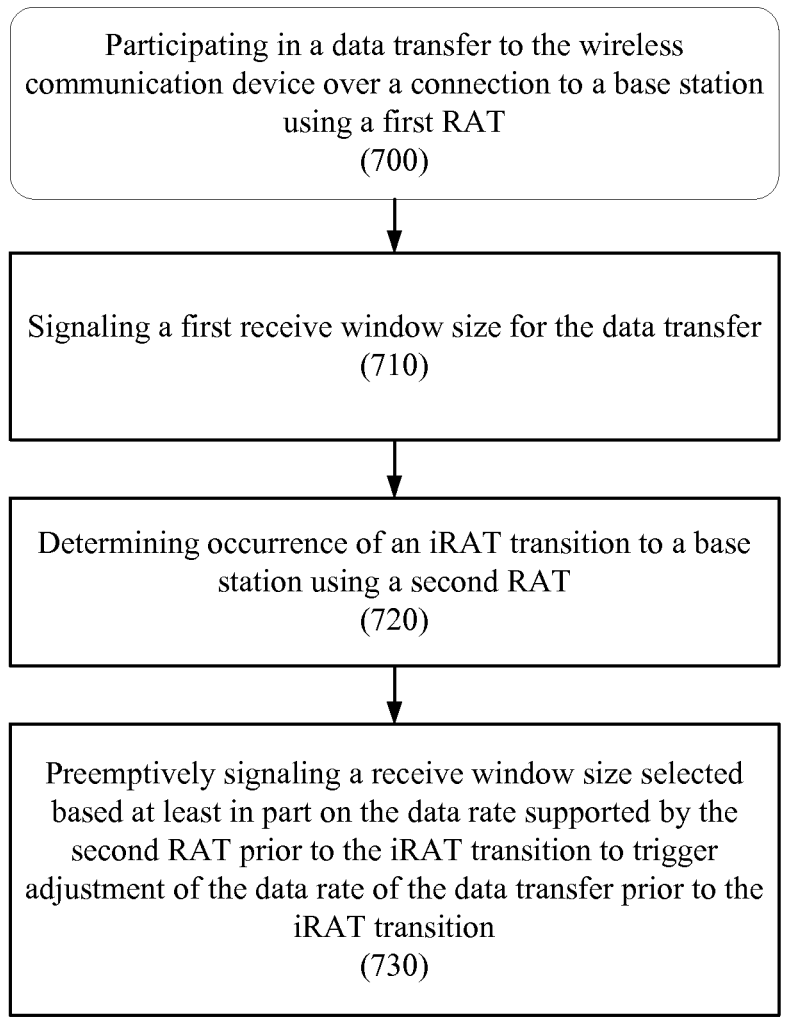
FIG. 7 illustrates a flow chart according to an example method for reducing packet loss at a wireless communication device during an inter-RAT transition in accordance with some example embodiments.

FIG. 7 illustrates a flow chart according to an example method for reducing packet loss at a wireless communication device during an iRAT transition in accordance with some example embodiments. In this regard, FIG. 7 illustrates operations that can be performed by wireless communication device 102 in accordance with some example embodiments in which the serving base station 104 can implement a first RAT and the alternative base station 106 can implement a second RAT. The method of FIG. 7 can, for example, be an embodiment of the method of FIG. 5 in which the connection interruption event is an iRAT transition. One or more of processor 202, transceiver 204, memory 206, processing circuitry 310, processor 312, memory 314, radio 316, or receive window signaling module 318 can, for example, provide means for performing one or more of the operations illustrated in and described with respect tot FIG. 7.

Operation 700 can include the wireless communication device 102 participating in a data transfer from a sender to the wireless communication device over a connection to a base station using a first RAT. The data source 110 can, for example, be the sender of the data transfer to the wireless communication device 102. In this regard, operation 700 can, for example, be an embodiment of operation 500.

Operation 710 can include the wireless communication device 102 signaling a first receive window size for the data transfer. The first receive window size can be a receive window size reflective of conditions at the wireless communication device, such as an amount of available space in a receiver buffer, an observed channel condition, and/or the like. In this regard, operation 710 can, for example, be an embodiment of operation 510.

Operation 720 can include the wireless communication device 102 determining occurrence of an iRAT transition to a base station using a second RAT. In this regard, operation 720 can, for example, be an embodiment of operation 520.

Operation 730 can include the wireless communication device 102 preemptively signaling a receive window size selected based at least in part on the data rate supported by the second RAT prior to the iRAT transition to trigger adjustment of the data rate of the data transfer prior to the iRAT transition. For example, if the second RAT supports a higher data rate than the first RAT, such as in the example case of transitioning from a legacy RAT to LTE, operation 730 can include signaling a receive window size that is larger than the first receive window size. If, however, the second RAT supports only a lower data rate than the first RAT, such as in the example case of transitioning from LTE to a legacy RAT, operation 730 can include signaling a receive window size that is smaller than the first receive window size. Operation 730 can, for example, be an embodiment of operation 530.

Figure 8:
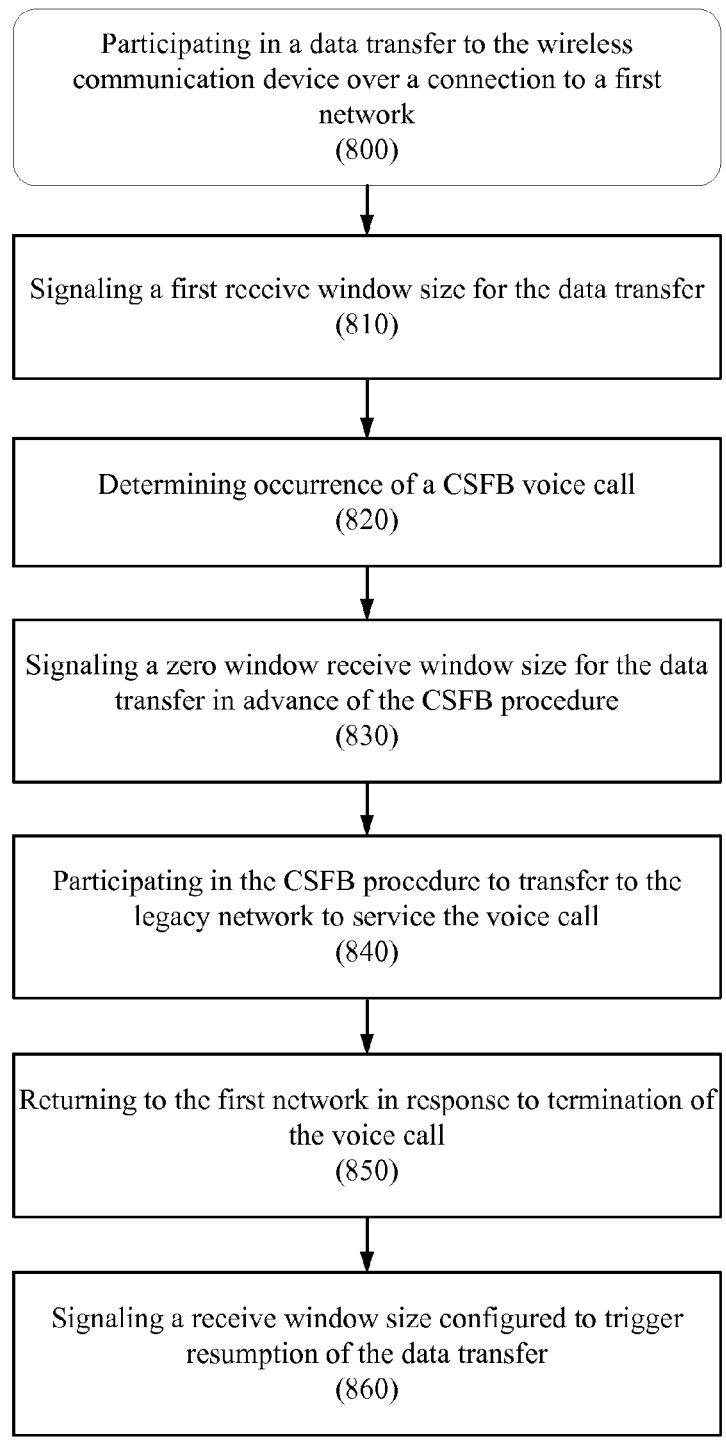
FIG. 8 illustrates a flow chart according to an example method for reducing packet loss at a wireless communication device in the event of a circuit switched fallback voice call in accordance with some example embodiments.

FIG. 8 illustrates a flow chart according to an example method for reducing packet loss at a wireless communication device in the event of a circuit switched fallback voice call in accordance with some example embodiments. In this regard, FIG. 8 illustrates operations that can be performed by wireless communication device 102 in accordance with some example embodiments in which the serving base station 104 can be associated with a first network implementing an LTE RAT that does not include support for voice calls and the alternative base station 106 can be associated with a legacy network implementing a legacy RAT having a circuit switched domain for supporting voice calls. The method of FIG. 8 can, for example, be an embodiment of the method of FIG. 5 in which the connection interruption event is a CSFB voice call. One or more of processor 202, transceiver 204, memory 206, processing circuitry 310, processor 312, memory 314, radio 316, or receive window signaling module 318 can, for example, provide means for performing one or more of the operations illustrated in and described with respect tot FIG. 8.

Operation 800 can include the wireless communication device 102 participating in a data transfer from a sender to the wireless communication device over a connection to a first network. The data source 110 can, for example, be the sender of the data transfer to the wireless communication device 102. The connection can, for example, be a connection through which data is received via the serving base station 104. In this regard, operation 800 can, for example, be an embodiment of operation 500.

Operation 810 can include the wireless communication device 102 signaling a first receive window size for the data transfer. The first receive window size can be a receive window size reflective of conditions at the wireless communication device, such as an amount of available space in a receiver buffer, an observed channel condition, and/or the like. In this regard, operation 810 can, for example, be an embodiment of operation 510.

Operation 820 can include the wireless communication device 102 determining occurrence of a CSFB voice call. The CSFB voice call can be a mobile-originating voice call, or can be a mobile-terminating voice call. In this regard, operation 820 can, for example, be an embodiment of operation 520.

Operation 830 can include the wireless communication device 102 signaling a zero window receive window size for the data transfer in advance of the CSFB procedure to stall the data transfer during the CSFB procedure. In this regard, operation 830 can, for example, be an embodiment of operation 530.

Operation 840 can include the wireless communication device 102 participating in the CSFB procedure to transfer to the legacy network (e.g., to the alternative base station 106) to service the voice call. Operation 850 can include the wireless communication device 102 returning to the first network (e.g., back to the serving base station 104) in response to termination of the voice call.

Operation 860 can include the wireless communication device 102 signaling a receive window size configured to trigger resumption of the data transfer after the wireless communication device 102 has returned to the first network from the CSFB voice call. In this regard, operation 860 can include signaling any non-zero receive window size. In some embodiments, operation 860 can include again signaling the first receive window size (e.g., the last non-zero receive window size signaled prior to operation 830). In this regard, operation 860 can, for example, be an embodiment of operation 540.

In an alternative to the embodiment illustrated in FIG. 8, in some embodiments, the data transfer may be ongoing during the CSFB voice call. For example, in such embodiments, data transfer can be performed over the legacy network in accordance with a data rate that can be supported by the legacy network. In some such embodiments, the method illustrated in FIG. 7 can be used to signal a receive window size that can adapt the data rate of the data transfer to a lower data rate that can be supported by the legacy network compared to the first network. Thus, for example, rather than signaling a zero window prior to the CSFB procedure and/or after completing the CSFB procedure to transition to the legacy network, a receive window size selected based on a data rate that can be supported by the legacy network can be signaled by the wireless communication device 102. A larger receive window size can, in turn, be signaled in response to the wireless communication device 102 returning to the first network after call termination.

Figure 9:
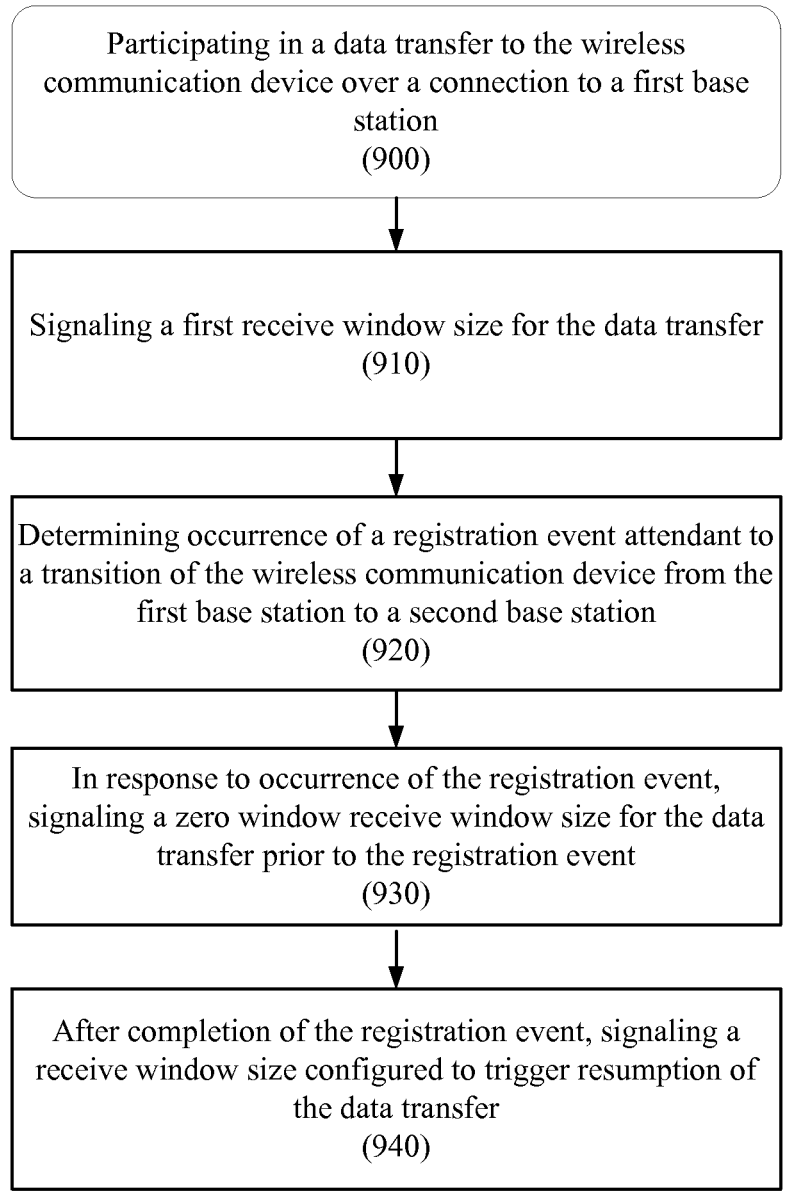
FIG. 9 illustrates a flow chart according to an example method for reducing packet loss at a wireless communication device during a registration event in accordance with some example embodiments.

FIG. 9 illustrates a flow chart according to an example method for reducing packet loss at a wireless communication device during a registration event in accordance with some example embodiments. In this regard, FIG. 9 illustrates operations that can be performed by wireless communication device 102 in accordance with some example embodiments. The method of FIG. 9 can, for example, be an embodiment of the method of FIG. 5 in which the connection interruption event is a registration event. One or more of processor 202, transceiver 204, memory 206, processing circuitry 310, processor 312, memory 314, radio 316, or receive window signaling module 318 can, for example, provide means for performing one or more of the operations illustrated in and described with respect tot FIG. 9.

Operation 900 can include the wireless communication device 102 participating in a data transfer from a sender to the wireless communication device over a connection to a first base station, such as serving base station 104. The data source 110 can, for example, be the sender of the data transfer to the wireless communication device 102. In this regard, operation 900 can, for example, be an embodiment of operation 500.

Operation 910 can include the wireless communication device 102 signaling a first receive window size for the data transfer. The first receive window size can be a receive window size reflective of conditions at the wireless communication device, such as an amount of available space in a receiver buffer, an observed channel condition, and/or the like. In this regard, operation 910 can, for example, be an embodiment of operation 510.

Operation 920 can include the wireless communication device 102 determining occurrence of a registration event. The registration event can be associated with a transition of the wireless communication device from the first base station to a second base station, such as to the alternative base station 104. In this regard, operation 920 can, for example, be an embodiment of operation 520.

Operation 930 can include the wireless communication device 102 signaling a zero window receive window size for the data transfer in advance of the registration event to stall the data transfer during the registration event. In this regard, operation 930 can, for example, be an embodiment of operation 530.

Operation 940 can include the wireless communication device 102 signaling a receive window size configured to trigger resumption of the data transfer after completion of the registration event. In this regard, operation 940 can include signaling any non-zero receive window size. In some embodiments, operation 940 can include again signaling the first receive window size (e.g., the last non-zero receive window size signaled prior to operation 930). In this regard, operation 940 can, for example, be an embodiment of operation 540.

Figure 10:
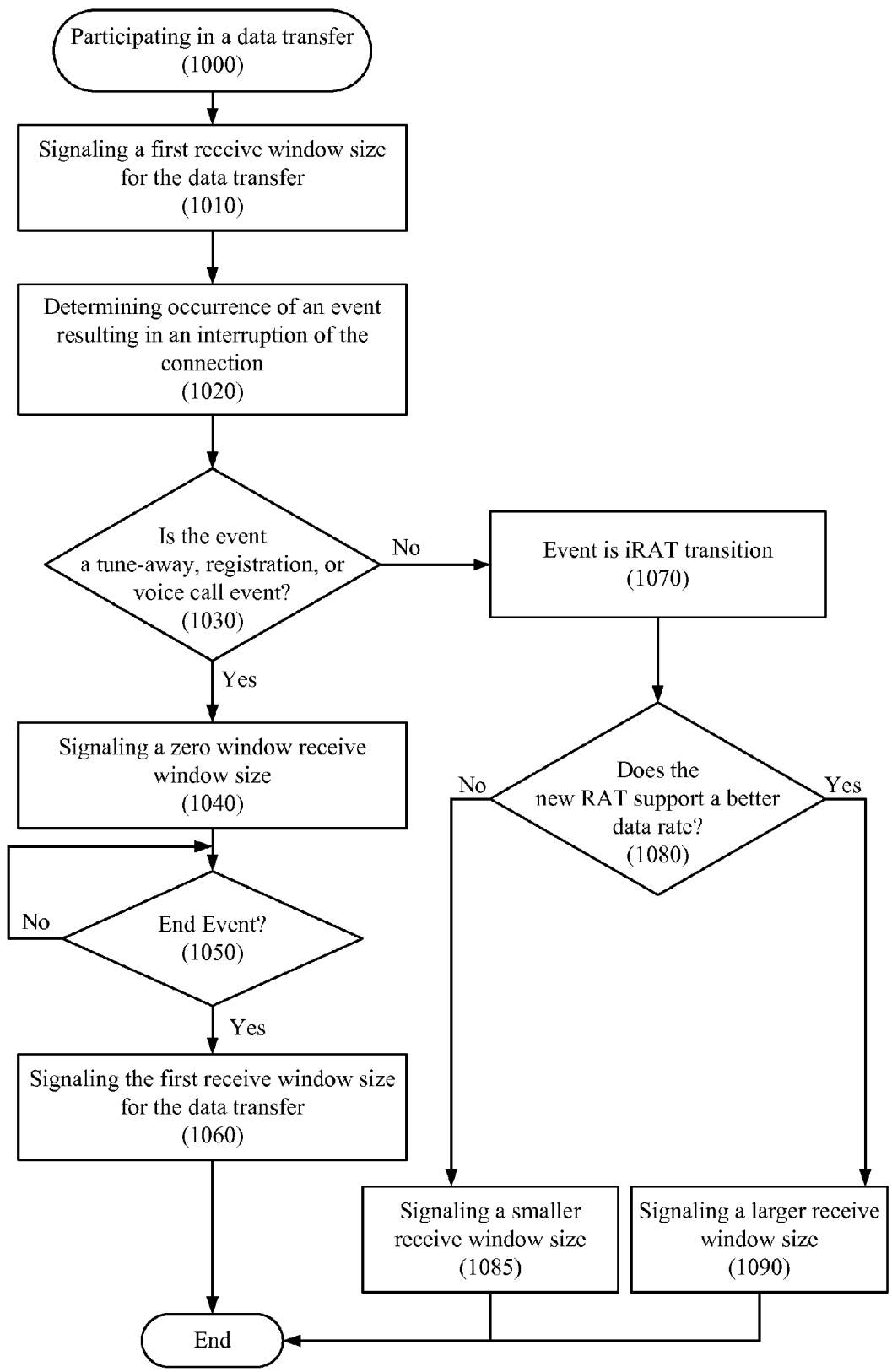
FIG. 10 illustrates a flow chart according to another example method for reducing packet loss at a wireless communication device in the event of a connection interruption in accordance with some example embodiments.

FIG. 10 illustrates a flow chart according to another example method for reducing packet loss at a wireless communication device in the event of a connection interruption in accordance with some example embodiments. In this regard, FIG. 10 illustrates operations that can be performed by wireless communication device 102 in accordance with some example embodiments. One or more of processor 202, transceiver 204, memory 206, processing circuitry 310, processor 312, memory 314, radio 316, or receive window signaling module 318 can, for example, provide means for performing one or more of the operations illustrated in and described with respect tot FIG. 10.

Operation 1000 can include the wireless communication device 102 participating in a data transfer from a sender to the wireless communication device over a connection. The data source 110 can, for example, be the sender of the data transfer to the wireless communication device 102. The connection can, for example, be a connection through which data is received via the serving base station 104.

Operation 1010 can include the wireless communication device 102 signaling a first receive window size for the data transfer. The first receive window size can be a receive window size reflective of conditions at the wireless communication device, such as an amount of available space in a receiver buffer, an observed channel condition, and/or the like.

Operation 1020 can include the wireless communication device 102 determining occurrence of an event resulting in an interruption of the connection. The event can, for example, be any event that can result in an interruption or outage of a physical layer connection.

In the example of FIG. 10, the wireless communication device 102 can be configured to handle different types of connection interruption events differently with respect to a receive window size that can be signaled in response to the connection interruption event. As such, in response to determining occurrence of the event, the wireless communication device 102 can be configured to determine a type of the connection interruption event. Determination of the type of event can, for example, include one or more filtering/ determination operations, such as operations 1030 and operation 1070 in the example of FIG. 10. However, it will be appreciated that alternative implementations are contemplated within the scope of the disclosure. For example, one or more of operations 1030 or 1070 can be split into multiple filtering/determination operations. As another example, operations 1030 and 1070 can be combined into a single operation that can be used to determine the type of event. As still a further example, in some embodiments, the ordering of operations 1070 and 1030 can be reversed from that illustrated in FIG. 10 in accordance with some embodiments such that it can be determined whether the event is an iRAT transition prior to determining whether the event is a tune-away, registration, or voice call event. As such, it will be appreciated that the arrangement of operations 1030 and 1070 in FIG. 10 is illustrated and described merely for purposes of illustrative example of how different types of events can be handled differently with respect to signaling a receive window size to influence adjustment of a data rate of the data transfer to avoid packet loss during the event in accordance with some example embodiments.

Operation 1030 can include the wireless communication device 102 determining whether the event is one of a tune-away, registration, or voice call event. In an instance in which it is determined at operation 1030 that the event is one of a tune-away, registration, or voice call event, the method can proceed to operation 1040, which can include the wireless communication device 102 signaling a zero window receive window size stall the data transfer during the event. Operation 1050 can include waiting until the event has completed. Operation 1060 can include the wireless communication device again signaling the first receive window size (e.g., the last non-zero receive window size signaled before operation 1040) to trigger resumption of the data transfer following the connection interruption event.

If, however, it is determined at operation 1030 that the event is not a tune-away, registration, or voice call event, the method can instead proceed to operation 1070, and operations 1040-1060 can be omitted. Operation 1070 can include the wireless communication device 102 determining whether the event is an iRAT transition. Operation 1080 can include the wireless communication device 102 determining whether the new RAT supports a better data rate than the present RAT. In this regard, an adaptive receive window mechanism can be triggered by the iRAT transition in order to preemptively adjust the receive window size to reflect the data rate supported by the new RAT. In an instance in which it is determined at operation 1080 that the new RAT does not support a better data rate, the method can proceed to operation 1085, which can include the wireless communication device 102 signaling a smaller receive window size than the first receive window size (e.g., a smaller receive window size than the most recent prior signaled receive window size). If, however, it is determined at operation 1080 that the new RAT does support a better data rate, the method can instead proceed to operation 1090, which can include signaling a larger receive window size than the first receive window size (e.g., a larger receive window size than the most recent prior signaled receive window size).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for reducing packet loss during a data transfer to a wireless communication client device over a connection, the method comprising the wireless communication client device:

signaling a first receive window size for the data transfer;

determining, before a connection interruption event, a time of the connection interruption event that results in an interruption of the connection, the connection interruption event including the wireless communication client device at least temporarily tuning from a first base station to a second base station; and in response to determining the time of the connection interruption event, signaling a second receive window size for the data transfer prior to the connection interruption event to trigger an adjustment of a data rate of the data transfer in preparation for the connection interruption event, wherein the second receive window size is based at least in part on a type of the connection interruption event, wherein types of connection interruption events comprise at least a tune-away event type, a registration event type, a circuit switched fallback (CSFB) event type, and an inter radio access technology (iRAT) transition event type, wherein signaling the second receive window size comprises signaling the second receive window size based at least in part on an indication provided by a physical layer to a higher layer in advance of the connection interruption event, wherein the indication communicates knowledge of a forthcoming interruption in a physical layer connection to a first network, and wherein the indication includes the type of connection interruption event, an event time at which the connection interruption event occurs, and a time duration of the connection interruption event.

2. The method of claim 1, wherein when the type of connection interruption event is the tune-away event type, signaling the second receive window size for the connection interruption event comprises signaling a zero window receive window size to stall the data transfer during the connection interruption event, the method further comprising the wireless communication client device:
signaling a third receive window size configured to trigger resumption of the data transfer following the connection interruption event.

3. The method of claim 2, wherein signaling the third receive window size configured to trigger resumption of the data transfer comprises resending signaling of the first receive window size.

4. The method of claim 2, wherein the tune-away event type comprises a tune-away period in which a radio of the wireless communication client device is temporarily tuned from the first base station to the second base station.

5. The method of claim 1, wherein the first base station implements a first radio access technology (RAT) and the second base station implements a second RAT, the second RAT supporting a different data rate than the first RAT, and wherein, when the type of connection interruption event is the iRAT transition event type:
determining the time of the connection interruption event comprises determining when an iRAT transition from the first RAT to the second RAT occurs; and
signaling the second receive window size comprises pre-emptively signaling a receive window size selected based at least in part on a data rate supported by the second RAT prior to the iRAT transition to trigger adjustment of the data rate of the data transfer in preparation for the iRAT transition.

6. The method of claim 1, wherein the type of connection interruption event is the registration event type performed attendant to a transition of the wireless communication client device from the first base station to the second base station, and wherein signaling the second receive window size for the registration event type comprises signaling a zero window receive window size.

7. The method of claim 1, wherein the first base station implements a Long Term Evolution (LTE) radio access technology (RAT) and the second base station implements a legacy RAT having a circuit switched domain, and wherein the type of connection interruption event is the CSFB event type performed in response to a voice call, and wherein signaling the second receive window size for the CSFB event type comprises signaling a zero window receive window size.

8. The method of claim 1, wherein signaling the second receive window size comprises signaling the second receive window size at a time prior to the connection interruption event determined based at least in part on an observed round trip time (RTT) for the data transfer to enable a sender to receive the second receive window size and adjust a data rate of the data transfer sufficiently in advance of the connection interruption event to prevent packet loss during the connection interruption event.

9. The method of claim 1, wherein the indication is provided by the physical layer to the higher layer via an intermediate layer in the wireless communication client device when the physical layer does not directly communicate with the higher layer.

10. The method of claim 1, wherein the connection interruption event comprises a scheduled tune-away period that comprises a known time duration.

11. A wireless communication client device comprising:
a radio configured to support communication with a first network and a second network; and
processing circuitry coupled with the radio, the processing circuitry configured to control the wireless communication client device to at least:
signal a first receive window size for a data transfer to the wireless communication client device via a connection;
determine a time, in advance of a connection interruption event, at which to signal an event-appropriate receive window size to enable a data source on the connection to receive an updated receive window size and adjust a data rate of the data transfer;
signal the updated receive window size for the data transfer in advance of the connection interruption event; and
signal another receive window size configured to trigger resumption of the data transfer over the first network after the connection interruption event,
wherein the event-appropriate receive window size is based at least in part on a type of the connection interruption event,
wherein signaling the updated receive window size comprises signaling the updated receive window size based at least in part on an indication provided by a physical layer to a higher layer in advance of the connection interruption event,
wherein the indication communicates knowledge of a forthcoming interruption in a physical layer connection to a first network, and
wherein the indication includes the type of connection interruption event, an event time at which the connection interruption event occurs, and a time duration of the connection interruption event.

12. The wireless communication client device of claim 11, wherein the processing circuitry is further configured to control the wireless communication client device to:
calculate a round trip time (RTT); and
use the calculated RTT to determine the time at which to signal the event-appropriate receive window size before the connection interruption event occurs.

13. The wireless communication client device of claim 11, wherein, when the type of the connection interruption event comprises a tune-away event type, the updated receive window size comprises a zero window receive window size, and wherein the tune-away event type comprises the radio tuning away from the first network to the second network for a tune-away period and the radio tuning back to the first network following the tune-away period.

14. The wireless communication client device of claim 11, wherein, when the type of the connection interruption event comprises a registration event type, the updated receive window size comprises a zero window receive window size.

15. The wireless communication client device of claim 11, wherein, when the type of the connection interruption event comprises a circuit switched fallback (CSFB) event type, the updated receive window size comprises a zero window receive window size.

16. The wireless communication client device of claim 11, wherein, when the type of the connection interruption event comprises an inter radio access technology (iRAT) transition event type between the first network that implements a first radio access technology (RAT) and the second network that implements a second RAT, the updated receive window size is based at least in part on the data rate supported by the second RAT as compared with the data rate supported by the first RAT.

17. A non-transitory computer-readable storage medium, storing a set of computer program instructions for reducing packet loss during a data transfer to a wireless communication client device over a connection via a first network, that when executed by one or more processors of a wireless communication client device, cause the wireless communication client device to:
- signal a first receive window size for the data transfer to the wireless communication client device over the connection;
- determine, before a connection interruption event, a time at which to signal an event-appropriate receive window size to enable a data source on the connection to receive a second receive window size and to adjust a data rate of the data transfer; and
- signal, at the determined time, the second receive window size before the connection interruption event,
- wherein the event-appropriate receive window size is based at least in part on a type of the connection interruption event,
- wherein types of connection interruption events comprise at least a tune-away event type, a registration event type, a circuit switched fallback (CSFB) event type, and an inter radio access technology (iRAT) transition event type,
- wherein signaling the second receive window size comprises signaling the second receive window size based at least in part on an indication provided by a physical layer to a higher layer in advance of the connection interruption event,
- wherein the indication communicates knowledge of a forthcoming interruption in a physical layer connection to a first network, and
- wherein the indication includes the type of connection interruption event, an event time at which the connection interruption event occurs, and a time duration of the connection interruption event.

18. The non-transitory computer-readable storage medium of claim 17, wherein when the type of the connection interruption event comprises a tune-away event type, a registration event type, or a circuit switched fallback (CSFB) event type, the second receive window size comprises a zero window receive window size.

19. The non-transitory computer-readable storage medium of claim 17, wherein, when the type of connection interruption event comprises an inter radio access technology (iRAT) transition event type between the first network that implements a first radio access technology (RAT) and a second network that implements a second RAT, the second receive window size is based at least in part on the data rate supported by the second RAT as compared with the data rate supported by the first RAT.

20. The non-transitory computer-readable storage medium of claim 19, wherein,
- when the second RAT supports a higher data rate as compared with the first RAT, the second receive window size is larger than the first receive window size, and
- when the second RAT supports a lower data rate as compared with the first RAT, the second receive window size is smaller than the first receive window size.

* * * * *